Feb. 15, 1927. 1,617,666

G. CATTANEO

STEERING MECHANISM

Filed Oct. 23, 1922

Inventor:
G. Cattaneo
By Marks Clerk
Attys.

Patented Feb. 15, 1927.

1,617,666

UNITED STATES PATENT OFFICE.

GIUSTINO CATTANEO, OF MILAN, ITALY.

STEERING MECHANISM.

Application filed October 23, 1922, Serial No. 596,426, and in Italy May 24, 1922.

In automobile vehicles the steering control is effected by means of a worm or of a cam in such a manner that the greatest demultiplication and consequently the smallest effort of the driver is required in effecting the steering of the car.

However, if the demultiplication is not reversible all shocks which the wheels receive on the road are necessarily absorbed by the lever which from the steering worm controls directly the oscillating swivels of wheels thus prejudicing the resistance of the said lever and the life of the worm. Contrarily if the said control is reversible the shocks are transmitted to the arms of driver thus rendering the steering hard and difficult.

The device to which this invention relates has for its purpose to absorb the shocks by resilient means so that the direct spreading of shocks upon the worm and also the driver is prevented.

Figure 1:
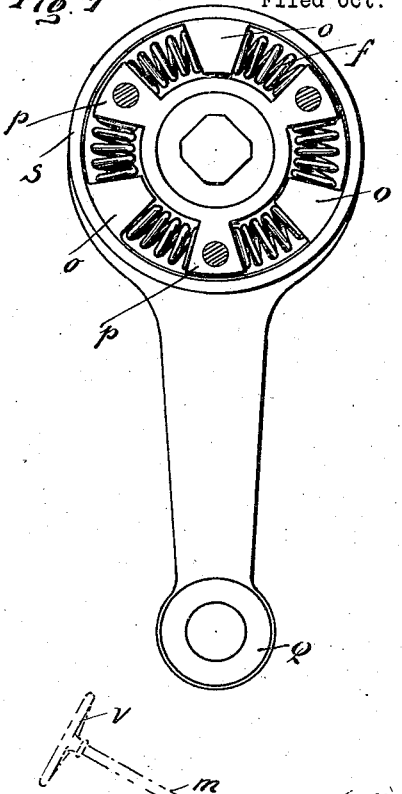
Figure 2:
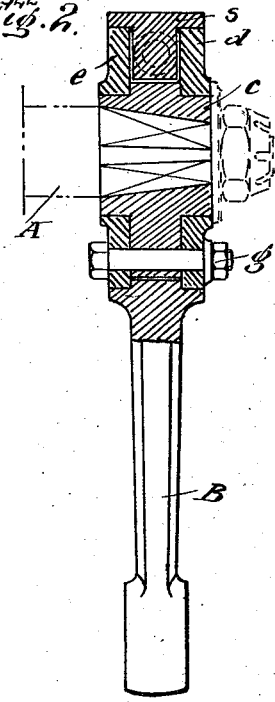
Figure 3:
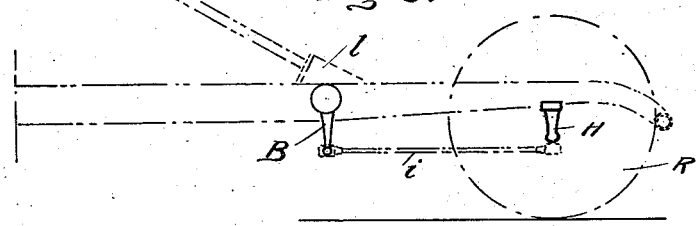
Figure 4:
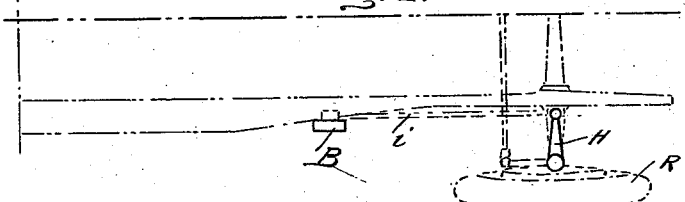

On the Figures 1 and 2 the said device is shown in a view and a section; the Figures 3 and 4 show respectively in elevation and in plan a diagrammatic view of the manner in which it is to be applied on the control of running wheels.

The driver acts by way of the steering wheel V on a worm and a worm wheel which are lodged within the box 1 controlling by means of lever B, rod $i$ and lever H the right oscillating pivot of the running wheels R.

The lever B has the inner of its bosses provided with three or more teeth O and comprises the socket $c$ which is keyed on the axle A of the worm wheel. The said socket $c$ has also three or more outer teeth $p$. Between teeth O within the hub of the lever B and the teeth $p$ upon the socket $c$ springs $f$ are interposed, one on both sides of every tooth.

Two discs $e$, $d$ fixed on the socket $c$ by means of a bolt $g$ maintain the bosses of lever B guided on the pivot A of the worm wheel. The lever B consequently can oscillate under the action of a certain effort which is exerted on its end Q, in either direction on the pivot A for every angle allowed by the springs $f$. The springs $f$ can be substituted by suitably hardened rubber blocks or a like resilient material which is able to this effect. Instead of on the lever B the said device can be applied also on the lever H.

In this manner the device serves the purpose to render elastic the driving system of steering and to preserve against shocks depending upon the bad nature of the road as through the gear reducing device to the driver.

Having now particularly described and ascertained the nature of my said invention and in what manner the same is to be performed, I declare that what I claim is:

In steering mechanism for motor vehicles, a shaft, a boss fixed to the shaft and provided with radially extending spaced arms, a ring loosely surrounding said boss and provided with inwardly extending radial arms arranged in the spaces between the arms of the boss, resilient elements in the ring arranged between the arms for normally maintaining the arms of the ring substantially midway between the arms of the boss, a pair of disks surrounding the shaft and arranged one on each side of said arms for enclosing the resilient elements and arms, a plurality of bolts passing through said disks and the arms on said boss for securing said disks to said boss, and a lever arm fixed to said ring.

Signed at Milan (Italy), this 3rd day of October, 1922.

GIUSTINO CATTANEO.